United States Patent
Nerieri

(10) Patent No.: US 9,692,643 B2
(45) Date of Patent: Jun. 27, 2017

(54) SYSTEMS AND METHODS FOR AUTOMATIC MODIFICATION OF DEVICE CONFIGURATION VALUES

(71) Applicant: Google Inc., Mountain View, CA (US)

(72) Inventor: Francesco Nerieri, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 426 days.

(21) Appl. No.: 13/843,955

(22) Filed: Mar. 15, 2013

(65) Prior Publication Data

US 2014/0006572 A1 Jan. 2, 2014

Related U.S. Application Data

(60) Provisional application No. 61/665,874, filed on Jun. 28, 2012.

(51) Int. Cl.
*G06F 15/177* (2006.01)
*H04L 12/24* (2006.01)
(Continued)

(52) U.S. Cl.
CPC .......... *H04L 41/0813* (2013.01); *H04L 67/26* (2013.01); *H04L 67/303* (2013.01);
(Continued)

(58) Field of Classification Search
CPC ................................ H04W 4/02; H04W 4/026
(Continued)

(56) References Cited

U.S. PATENT DOCUMENTS 7,793,122 B1 * 9/2010 Manuilov ...................... 713/300
8,020,192 B2 * 9/2011 Wright ..................... H04W 4/02
709/221

(Continued)

FOREIGN PATENT DOCUMENTS

TW 200828909 A 7/2008

OTHER PUBLICATIONS

PCT/US2013/048705 International Search Report and Written Opinion mailed Jan. 14, 2014.
(Continued)

*Primary Examiner* — Bharat N Barot
(74) *Attorney, Agent, or Firm* — Troutman Sanders LLP; James E. Schutz; Brennan M. Carmody

(57) ABSTRACT

Implementations may include automatically initiating modification of one or more configuration values of a remote computing device, the configuration values determining how status messages are sent from the remote computing device. The status messages may be sent either at the prompting of a messaging server or, alternatively, autonomously by the computing device. The status message may indicate the state of the computing device, for example, one or more of "awake," "active," "idle," etc., a current battery level, whether the computing device is fully charged or is plugged into an external power source, whether the radio is currently active, current location, the type of network on which the computing device is being used (e.g., Wi-Fi, 3G, 3G). The modifications to the configuration values may be based on, among other things, location, user behavior, or device usage patterns, thus enabling efficient scheduling of push notification delivery based on the modified configurations.

17 Claims, 3 Drawing Sheets

(51) Int. Cl.
*H04L 29/08* (2006.01)
*H04W 8/24* (2009.01)
*H04W 4/02* (2009.01)
*H04W 4/20* (2009.01)

(52) U.S. Cl.
CPC ............... *H04W 8/24* (2013.01); *H04L 67/32* (2013.01); *H04W 4/02* (2013.01); *H04W 4/026* (2013.01); *H04W 4/20* (2013.01)

(58) Field of Classification Search
USPC .................. 370/338, 311; 455/456.2, 456.1; 715/736; 705/7; 713/300; 709/201–203, 709/217–219, 220–221
See application file for complete search history.

(56) References Cited

U.S. PATENT DOCUMENTS

| | | | | |
|---|---|---|---|---|
| 8,478,306 | B2* | 7/2013 | Zheng | H04W 4/02 455/456.1 |
| 8,572,198 | B2* | 10/2013 | Jhanji | H04W 4/02 709/203 |
| 9,225,522 | B2* | 12/2015 | Sayed | H04L 67/2847 |
| 2004/0180649 | A1* | 9/2004 | Vogel et al. | 455/418 |
| 2005/0107100 | A1* | 5/2005 | Gustafsson et al. | H04W 8/18 455/466 |
| 2005/0267788 | A1* | 12/2005 | Brown et al. | 705/7 |
| 2006/0258371 | A1 | 11/2006 | Krishnamurthi et al. | |
| 2007/0223428 | A1* | 9/2007 | Patterson et al. | 370/338 |
| 2008/0049714 | A1 | 2/2008 | Commarford et al. | |
| 2008/0125140 | A1* | 5/2008 | Udani | 455/456.1 |
| 2008/0254811 | A1* | 10/2008 | Stewart | 455/456.2 |
| 2008/0291831 | A1 | 11/2008 | Alpert et al. | |
| 2009/0080359 | A1 | 3/2009 | Song et al. | |
| 2010/0279669 | A1* | 11/2010 | Roundtree | 455/414.2 |
| 2010/0289659 | A1 | 11/2010 | Verbil | |
| 2011/0276396 | A1* | 11/2011 | Rathod | H04W 4/003 709/203 |
| 2012/0231847 | A2* | 9/2012 | Dodge | G06F 3/04883 455/566 |
| 2012/0266073 | A1* | 10/2012 | Tanaka et al. | 715/736 |
| 2013/0237243 | A1* | 9/2013 | Kuehnel et al. | 455/456.1 |
| 2014/0086122 | A1* | 3/2014 | Gupta et al. | 370/311 |

OTHER PUBLICATIONS

European Patent Application No. 13810469.0 Extended European Search Report, mailed Feb. 1, 2016.

* cited by examiner

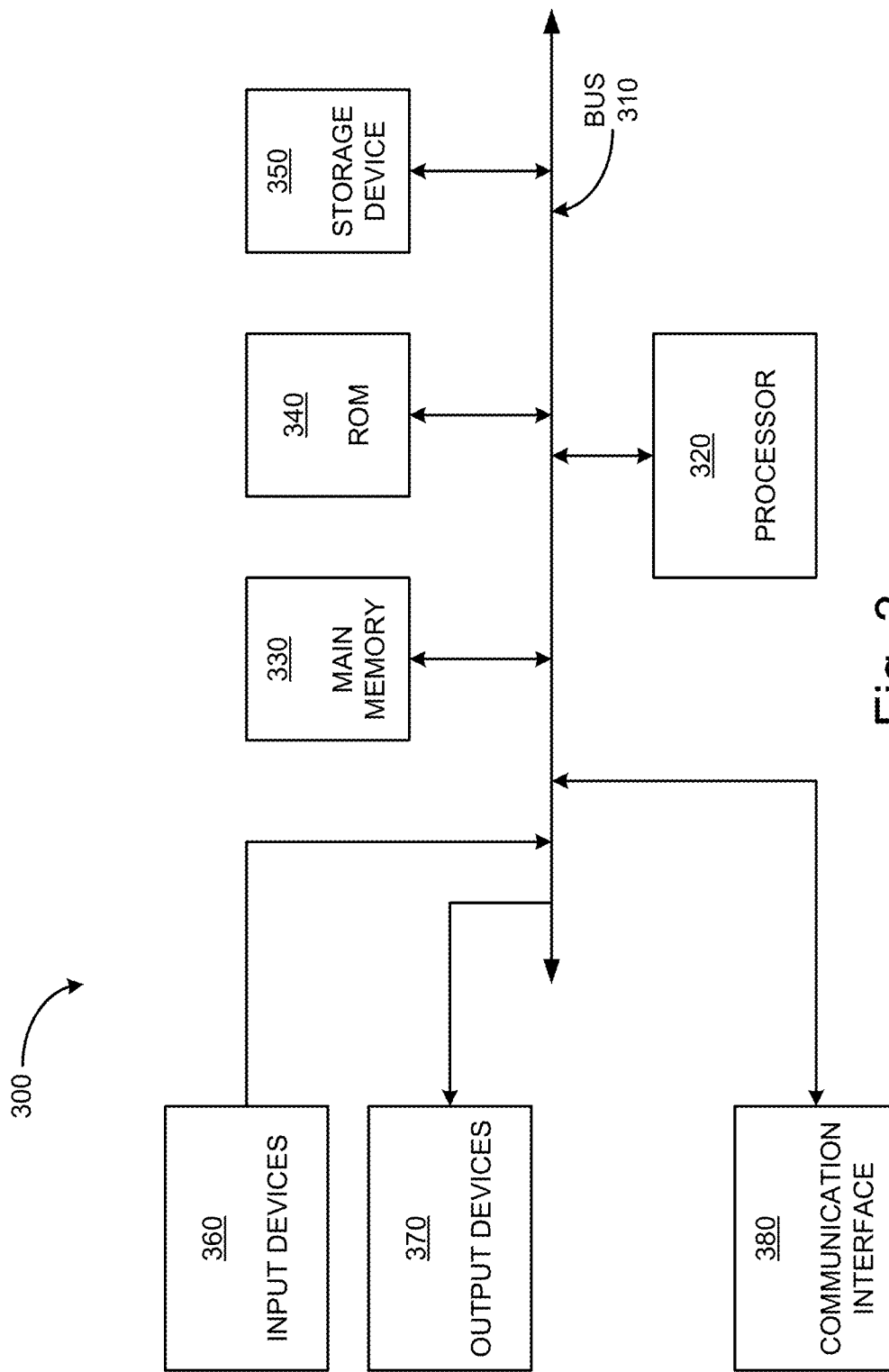

SYSTEMS AND METHODS FOR AUTOMATIC MODIFICATION OF DEVICE CONFIGURATION VALUES

CROSS-REFERENCE TO RELATED APPLICATIONS

This application claims priority and the benefit under 35 U.S.C. §119(e) of U.S. Provisional Patent Application No. 61/665,874, filed Jun. 28, 2012, of which the entire contents and substance are hereby incorporated by reference as if fully set forth below.

BACKGROUND

Push notification services are in widespread use for sending messages to various computing devices, including mobile devices. For example, a push notification may be sent from a message server to a user's mobile device to notify the user of receipt of a new email message. Push services can reduce the required work of a mobile device by relieving the mobile device of the need to check continuously for new email or other new messages from remote servers.

A downside of push messaging is that a mobile device must be awake, i.e., powered on, in order to receive new messages. Moreover, by delivering messages unprompted, a messaging server may repeatedly wake up a device, thus draining the device's battery power. Additionally, by sending messages to devices that are not in active use, messaging servers may overburden themselves unnecessarily. Accordingly, push messaging may still result in inefficient delivery of messages to a mobile device, particularly when the message server is unaware, or not up-to-date on the current status of the mobile device.

SUMMARY

Some or all of the above needs may be addressed by certain implementations of the disclosed technology. Certain implementations may include automatically initiating modification of one or more configuration values of a remote computing device, the configuration values determining how status messages are sent from the remote computing device. In various implementations, the modifications to the configuration values may be based on, among other things, location, user behavior, or device usage patterns, thus enabling efficient scheduling of push notification delivery based on the modified configurations.

According to an example implementation, a method is provided. The method may include receiving, at a message server or other computing system, a first status update indicating an activity state of a first computing device and initiating a modification of one or more configuration values of the first computing device based on the first status update, the configuration values determining how the first computing device sends status updates. The method may further include receiving, at the computing system, a first message directed toward the first computing device, receiving, at the computing system, a second status update indicating the activity state of the first computing device, the second status update based on the modified configuration values of the first computing device, and transmitting the first message to the first computing device, responsive to receiving the second status update.

According to another example implementation, a system is provided. The system may include a message server or other computing system in communication with a first computing device, at least one processor operatively coupled to the computing system, and at least one memory operatively coupled to the at least one processor and configured for storing data and instructions. When executed by the at least one processor, the data and instructions may cause the system to: Receive, at the computing system, a first status update from the first computing device, the first status update indicative of an activity state of the first computing device and transmit instructions to the first computing device to adjust one or more configuration values at the first computing device. The system may be further caused to receive, at the computing system, a first message directed toward the first computing device, receive, at the computing system, a second status update from the first computing device, the second status update sent based on the adjusted configuration values at the first computing device, and determine a time for delivery of the first message to the first computing device based on the second status update. The system may yet further be caused to transmit the first message to the first computing device responsive to the determined time occurring.

According to yet another example implementation, a computer program product is provided. The computer program product may include a non-transitory computer-readable medium that stores instructions executable by one or more processors to perform a method. The method may include receiving, at a message server or other computing system, a plurality of messages directed to plurality of computing devices, including a first computing device and identifying a first message as being directed to the first computing device. The method may further include receiving, at the computing system, a first status update indicating an activity state of the first computing device and prompting, based on at least the first status update, the first computing device to set one or more configuration values at the first computing device, the configuration values determining when the first computing device sends status updates. The method may yet further include receiving, at the computing system, a second status update indicating the activity state of the first computing device, the second status update sent based on the set configuration values and transmitting the first message to the first computing device, responsive to receiving the second status update.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 3 is a diagram of an architecture of a message server, according to an implementation.

DETAILED DESCRIPTION

Figure 1:
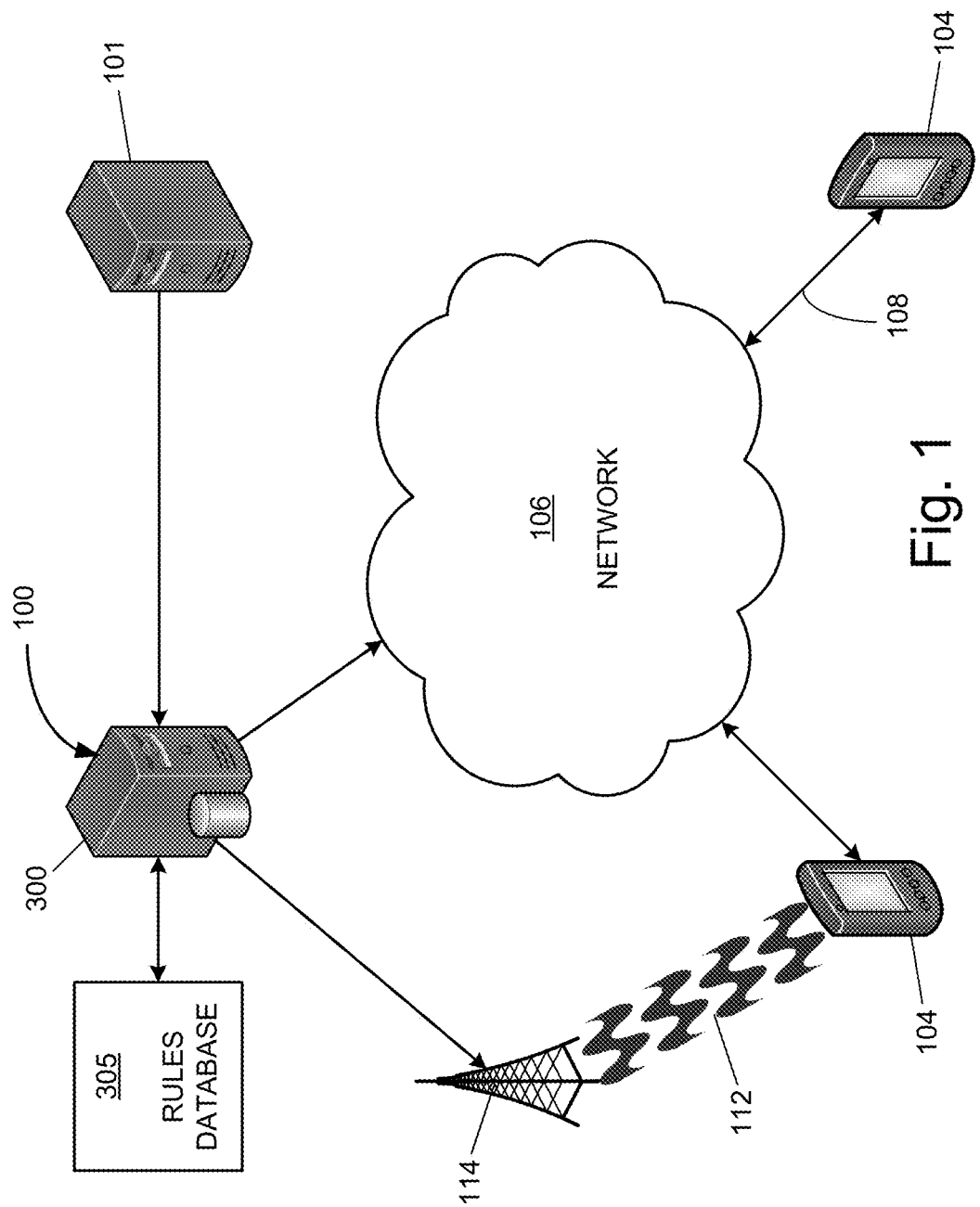
FIG. 1 is a block diagram of an illustrative messaging system according to an example implementation.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Many mobile devices currently use push messaging to receive data. A push message is data transmitted to the mobile device without prompting, or without the mobile device first having to check for messages. A message may be directed to a mobile device from, for example, from an application server remote from the mobile device. In some instances, the message may be transmitted from the application server to a message server, which may manage message delivery for a plurality of mobile devices receiving push messages from a plurality of sources.

In conventional messaging systems, push messages are transmitted from the message server to the recipient mobile devices responsive to receipt of the messages at the message server. This generally occurs without purposeful delay. As a result, mobile devices receive messages directed to them efficiently, without having to prompt the message server to determine whether messages are waiting.

A downside of push messaging is that a mobile device must be awake, i.e., powered on, in order to receive new messages. Moreover, by delivering messages unprompted, a messaging server may repeatedly wake up a device, thus draining the device's battery power. Additionally, by sending messages to devices that are not in active use, messaging servers may overburden themselves unnecessarily. Accordingly, push messaging may result in inefficient delivery of messages to a mobile device, particularly when the message server is unaware, or not up-to-date on the current status of the mobile device.

In some implementations of the disclosed technology, a readiness of a mobile device to receive push notifications may be determined based on status messages sent from the mobile device and received at the message server. However, the received status messages may not accurately indicate the current state of the mobile device. Moreover, a status message can mislead a message server as to the readiness of the mobile device, or the user of the mobile device, to receive push notifications. For example, if the screen of a particular mobile device is often turned on for no more than 30-60 seconds and then shut off again, then it might be beneficial for the mobile device not to notify the messaging server 300 that the mobile device is idle (i.e., ready to receive push notifications) during that time period.

Accordingly, certain implementations of the disclosed technology may automatically initiate modification of one or more configuration values of a remote computing device, the configuration values determining how status messages are sent from the remote computing device. In various implementations, the modifications to the configuration values may be based on, among other things, location, user behavior, or device usage patterns, thus enabling efficient scheduling of push notification delivery based on the modified configurations.

Referring now to the figures, in which like reference numerals represent like parts throughout the views, various implementations of the messaging systems and methods will be described in detail.

FIG. 1 is a block diagram of an illustrative messaging system 100 according to the disclosed technology. The messaging system 100 may be embodied, in whole or in part, in a messaging server 300 in communication with one or more application servers 101. The messaging server 300 may be or include a computer system, such as that illustrated in FIG. 3.

The messaging server 300 may receive messages from the application server 101, and may communicate the received messages to computing devices 104, such as a mobile device or desktop or laptop computer, by push messages. It will be understood that there are numerous categories of mobile devices 104 that may be used in conjunction with the disclosed technology. For example, mobile devices 104 can include, but are not limited to, portable computers, tablets, Internet tablets, personal data assistants, ultra mobile personal computers, and smartphones.

The application servers 101 may be servers supporting applications installed on, or running on, the computing devices 104. Occasionally, an application server 101 may communicate a data message to a computing device 104 for use in the corresponding application on the computing device 104. It will be understood that a message need not be an email or a text message, but may alternatively be various types of data delivered to the mobile device as a transmission from a remote device. For example, and not limitation, the application server 101 may be associated with a weather application, and may transmit weather updates to the computing device 104. For another example, the application server may be associated with an electronic mail application, and may transmit email messages to the computing device 104. Messages from the application server 101 may be delivered by way of the messaging server 300, which may manage delivery according to the disclosed technology, as will be described further below.

The messaging server 300 may communicate with the computing device 104 in various ways. For example, the messaging server 300 may communicate with the computing device 110 through a Wi-Fi channel or another Internet connection 108, and may utilize a network 106 for communication with the computing device 104. For another example, the messaging server 300 may communicate to the computing device 104 through a service provider 114, such as a cellular service provider or other network provider supporting mobile devices. The service provider 114 may provide cellular service through cellular radio channels 112 for communicating with the mobile device 104. In that case, the messaging server 300 may communicate or send messages to the mobile device 104 through the service provider 114.

The messaging server 300 may be in communication with a plurality of computing devices 104 belonging to a plurality of users. Further, the messaging server 300 may receive a plurality of messages for the various computing devices 104. The messaging server 300 may sort the received messages and associate each message with its intended recipient computing device 104. Instead of delivering all messages to the recipient computing devices 104 immediately upon receipt, however, the messaging server 300 may batch the messages for each computing device 104.

The messaging server 104 may determine when to send a batch of messages to its corresponding, recipient computing device 104 by applying a set of one or more delivery rules, which may be stored in a rules database 305, as shown in FIG. 1. The delivery rules may be designed to consider device activity, location, or user behavior when determining when to deliver messages. It will be understood that the rules database need not be a relational database, but may instead use various methods of data organization accessible by the messaging system 300.

In an example implementation, the messaging server 300 may have access to state, or status, information related to the computing device 104. The computing device 104 may send information about its current state to the messaging server 300. The information may be sent either at the prompting of the messaging server 300 or, alternatively, autonomously by the computing device 104. For example, and not limitation, the computing device 104 may send to the messaging server 300 information about its current battery level, whether the computing device 104 is fully charged or is plugged into an external power source, whether the radio is currently active, current location, the type of network on which the computing device 104 is being used (e.g., Wi-Fi, 3G, 3G), whether it is unlocked or currently in use, or whether it just became in use.

Some information about the computing device's state may not be unique to a particular computing device 104, and the messaging server 300 may have access to that type of information from other sources or by retaining past data about the computing device 104. For example, and not limitation, the messaging server 300 may also have information about the current date, time of day, and past usage patterns of the computing device 104 in question, as well as other computing devices 104 in the local area of the computing device 104.

A computing device's state may be based, at least in part, on various configuration values of that computing device. The configuration values may determine, for example, what circumstances lead to the device being deemed idle (i.e., the definition of "idle"), what circumstances lead to the device being deemed awake (i.e., the definition of "awake"), or what circumstances lead to the device being deemed otherwise unavailable (i.e., the definition of "unavailable"). These configuration values may, in some implementations, vary between different computing devices 104. The configuration values may play a role in defining a current state of the computing device 104.

The messaging server 300 may automatically modify, or initiate modification of, the configuration values of the computing device 104 based on device location, user behavior, device usage patterns, or a combination of these. In some implementations, such a modification may be designed to optimize message delivery or to improve some aspect of message delivery, such as, for example, by conserving battery power of the computing device 104 or reducing traffic on the messaging server 300. In some implementations, a computing device 104 may initially have a set of default configuration values, but these values may change based on direction of the messaging server 300.

The messaging server 300 may use a computing device's state information, including user behavior or usage history, to determine whether one or more configuration values of the computing device 104 should be modified. For example, and not limitation, if the screen of a particular computing device 104 is often turned on for no more than 30-60 seconds and then shut off again, then it might be beneficial for the computing device 104 not to notify the messaging server 300 that it is idle during that time period. A computing device 104 being idle may initiate message delivery from the messaging server 300. However, new messages might be of little use to the computing device 104 if the screen of computing device 104 is immediately turned off, thus putting the computing device 104 out of use.

Thus, it may be desirable for a computing device 104 to postpone notifying the messaging server 300 that it is idle, if that computing device 104 has frequently or recently experienced a screen-on followed within a predetermined time period by a screen-off. Postponing an idle indication in that case may reduce workload of the messaging server 300. Accordingly, if the messaging server 300 determines based on the computing device's past or current state that the computing device 104 is experiencing or has experienced screen-ons closely followed by screen-offs, the messaging server 300 may direct the computing device 104 to modify one or more configuration values to redefine the circumstances that lead to an idle notification. For example, and not limitation, instead of the computing device 104 deeming itself to be idle as soon as the screen is turned on, it may be directed to deem itself idle only after a predetermined time period, e.g., two minutes, has passed with the screen remaining on. Upon direction from the messaging server 300, the computing device 104 may modify, or adjust, its configuration values as directed.

For another example, if the screen of a computing device is often left off for extended periods of time, then it might be beneficial for the computing device 104 to notify the messaging server 300 that it is idle right away, or after only a short period. In this example, it may be assumed that the screen will be off for a long time when it is turned off, so it may be desirable to send messages right away when the screen is turned on, to avoid having to hold on to messages at the server for an unnecessarily long time. In that case, the messaging server 300 may direct the computing device to modify its configuration values to define idle as requiring a short screen-on time, e.g., thirty seconds.

"Awake" may generally be an indication of when the computing device is powered up, i.e., not in stand-by or sleep mode and not turned off. When awake, a computing device 104 may or may not be idle; idle may indicate that a computing device 104 is awake but not in active use. In some implementations, a computing device's configuration values may also include one or more values indicating when the computing device 104 is to deem itself awake. For example, and not limitation, awake may be defined as one of the following, depending on the configuration values: screen on regardless of whether the computing device 104 is locked; screen on and computing device 104 is unlocked; or screen on and computing device 104 has been unlocked for a predetermined time period. Based on the state information about the computing device 104, possibly including user behavior or usage history, the messaging server 300 may determine that one or more configuration values related to the definition of "awake" should be changed. The messaging server 300 may then direct the computing device 104 to modify, or adjust, one or more configuration values to result in the desired new values.

For each computing device 104, the messaging server 300 may determine when to send messages directed to that computing device 104, based on application of the delivery rules in the rules database 305 to that computing device's current state, where the current state may be at least partially dependent on the configuration values of the computing device 104. Thus, a modification of a computing device's configuration values may affect the timing of message delivery.

The delivery rules may be applied to each computing device 104 individually, or to groups of computing devices 104 deemed to be similar in state. In some implementations, the delivery rules may be provided in advance, such as by a system administrator, but in other implementations, one or more rules may be generated or modified dynamically based on historical data related to usage history of the computing devices 104 to which they apply. A rule may be applicable to a single computing device 104 or to two or many computing devices 104, so that each computing device 104 may, in some implementations, be associated with its own corresponding set of rules.

In some implementations of the disclosed technology, the delivery rules for a computing device 104 may consider state information related to a plurality of other computing devices within a geo-location or predetermined range of the computing device 104. Various computing devices 104 may provide their states to the messaging server 300. Thus, the messaging server may determine the quantity or density of active computing devices 104 within a certain geo-location of, or predetermined range surrounding, a computing device 104. This quantity or density may be considered as part of the computing device's state when applying the delivery rules. For example, and not limitation, a delivery rule may indicate that messages are to be held, i.e., not delivered immediately, when the computing device is in a crowded area. In some implementations, the messaging server 300 may delay messages to some computing devices 104, but not other computing devices 104, within a crowded area. Alternatively, the messaging server 104 may provide messages to the computing devices 104 within a crowded area in a staggered manner, so that not all messages to all of the computing devices 104 are transmitted at the same time. Delivery of messages to many computing devices 104 within a small area may overtax a messaging server 300. Thus, such a delay or staggering may enable the messaging server 300 to continue running smoothly without an unreasonable workload.

For example, and not limitation, the delivery rules associated with a particular computing device 104 in the rules database 305 may include one or more of the following: (1) Hold messages if the computing device 104 is in a crowded area. (2) Deliver messages immediately if the computing device 104 is awake and idle. (3) Deliver messages if the computing device is awake. These example rules may be used to balance battery usage with fast message delivery, while at the same time limiting impact on a local message server 300 by delaying messages to a large group of people in the same crowded area. It will be understood, however, that other or additional delivery rules may be used in some implementations of the disclosed technology. For example, and not limitation, delivery rules may be based on location, time of day, or past usage patterns.

Figure 2:
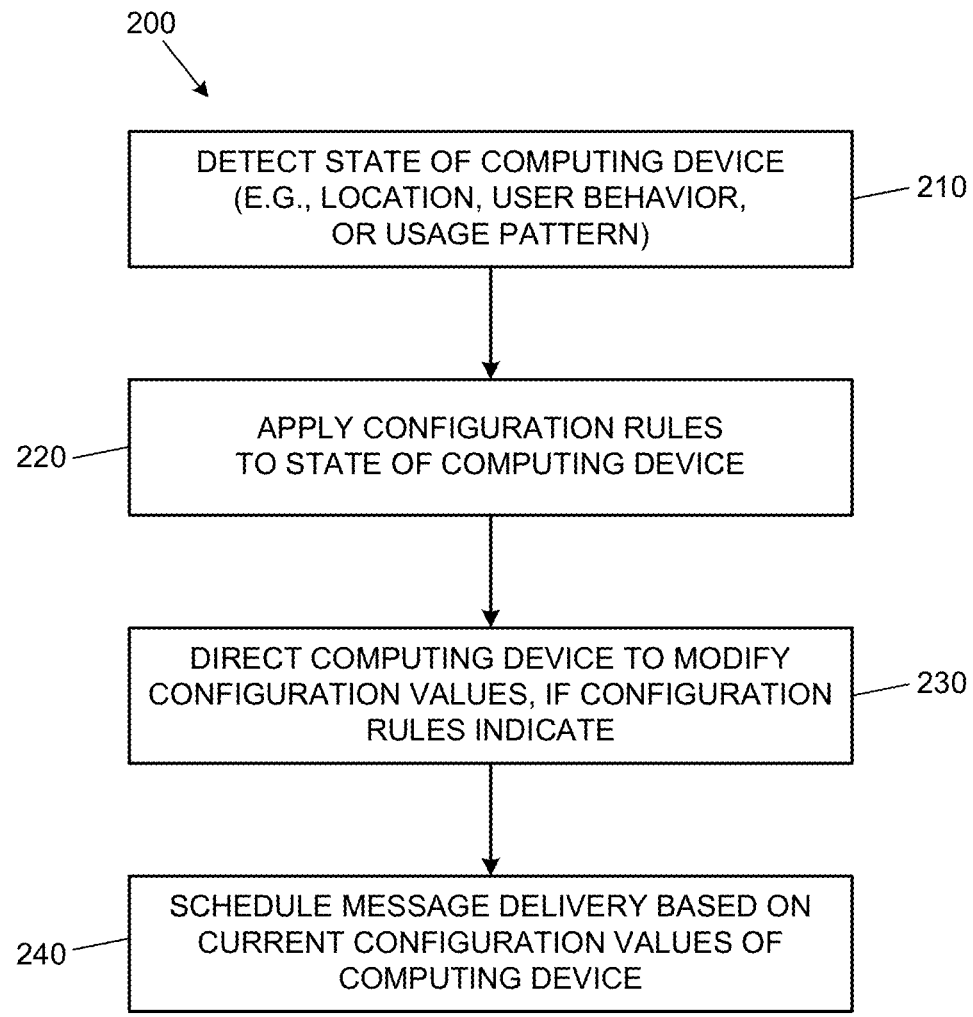
FIG. 2 is a flow diagram of delivering messages to a computing device, according to an example implementation.

FIG. 2 is a flow diagram of a method of delivering messages to a computing device 104, according to an implementation of the disclosed technology. As shown, at 210, information about a state of the computing device 104 is received. At 220, the messaging server 300 determines whether the configuration values of the computing device should be updated, based at least in part on the state of the computing device 104. If the messaging server 400 determines that the configuration values should be updated, at 230, the messaging server 300 directs the computing device 104 to update its configuration values. Actions 210, 220, and 230 may occur repeatedly to keep the messaging server 400 updated as to the computing device's state, and to keep the computing device's configuration values at desirable values. At 240, the messaging server 400 receives one or more messages for the mobile computing device. At 250, based on application of one or more delivery rules, the messaging server determines whether to deliver the messages or to hold them temporarily. The result of the delivery-rules application may be dependent on the computing device's current state and configuration values. It will be understood that the various steps shown in FIG. 2 are illustrative only, and that steps may be removed, other steps may be used, or the order of steps may be modified. Additionally, it will be understood that the various actions of FIG. 2 may be performed repeatedly to optimize or improve message delivery.

In some alternative implementations of the disclosed technology, a computing device 104 may locally determine when to retrieve the full content of messages directed to it. In other words, the messaging server 300 may notify the computing device 104 that one or more messages are available for the computing device 104 and being held at the messaging server or at the respective application servers 101. The delivery of notification may be determined in the same way, or in a similar way, as determination of when messages are to be delivered, as discussed above. For example, the messaging system 300 may apply one or more delivery rules to the computing device's state to determine whether to send notifications, and the computing device's state may be based at least in part on its configuration values.

Additionally or alternatively, the messaging server 300 may detect when a computing device 104 reconnects to the messaging server 104 after having been disconnected (e.g., turned off or out of service area). If messages were received at the messaging server 300 during the period of disconnection, the messaging server 300 may send a notification of waiting messages to the computing device 104 upon reconnection.

After a notification is received at the computing device 104, the computing device may determine when to prompt delivery of the entire message content. This determination may be based on various factors.

The computing device 104 may locally store one or more delivery rules that determine when it prompts the messaging server 300 to deliver its messages. These rules may be similar to the delivery rules that may be stored in the rules database 305. For example, and not limitation, the delivery rules may include one or more of the following: 1) Do not request messages if the computing device 104 is in a crowded area. (2) Request messages if the computing device 104 is awake and idle. (3) Do not request messages if the computing device is in a crowded location. (4) Request messages if the computing device is awake. As discussed above, the current configuration values of the computing device 104 may be relevant to the application of these or other rules. It will be understood that other or additional delivery rules may be used in some implementations of the disclosed technology. For example, and not limitation, delivery rules may be based on location, time of day, or past usage patterns.

Various implementations of the messaging systems 100 and methods may be embodied in non-transitory computer readable media for execution by a computer processor. FIG. 3 is a diagram of an example architecture of the messaging server 300, in an implementation consistent with the disclosed technology. As shown, the messaging server 300 may include a bus 310, a processor 320, a main memory 330, a read only memory (ROM) 340, a storage device 350, one or more input devices 360, one or more output devices 370, and a communication interface 380. The bus 310 may include one or more conductors that permit communication among the components of the messaging server 300.

The processor 320 may be one or more conventional processors or microprocessors that interpret and execute instructions, such as instructions for providing aspects of the disclosed technology. The main memory 330 may include a random access memory (RAM) or another dynamic storage device that stores information and instructions for execution by the processor 320. The ROM 340 may include a conventional ROM device or another type of static storage device that stores static information or instructions for use by the processor 320. The storage device 350 may include a magnetic or optical recording medium and its corresponding drive.

The input devices 360 may include one or more mechanisms that permit an operator to input information to the messaging server 300, such as a keyboard, a mouse, a pen, voice recognition, or biometric mechanisms. The output devices 370 may include one or more mechanisms that output information to an operator, including a display, a printer, or a speaker. The communication interface 380 may include any transceiver-like mechanism that enables the messaging server 300 to communicate with remote devices or systems, such as a mobile device or other computing device 104 to which messages are delivered. For example, the communication interface 380 may include mechanisms for communicating over a network.

As discussed above, the messaging server 300 may manage message delivery to a plurality of computing devices 104. The messaging server 300 may perform tasks to that end in response to the processor 320 executing software instructions contained in a computer-readable medium, such as memory 330. The software instructions may be read into memory 330 from another computer-readable medium, such as the data storage device 350, or from another device via the communication interface 380. Alternatively, or additionally, hardwired circuitry may be used in place of or in combination with software instructions to implement processes consistent with the disclosed technology. Thus, the disclosed technology is not limited to any specific combination of hardware circuitry and software.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
receiving, over a network, at a computing system in communication with a plurality of remote computing devices including a first mobile computing device, a first status update indicating an activity state of the first mobile computing device, wherein the activity state indicates at least a current location of the first mobile computing device;
initiating, automatically over the network, by the computing system, a modification of one or more configuration values of the first mobile computing device based at least on the current location of the first mobile computing device received as part of the first status update, the configuration values determining how the first mobile computing device sends status updates;
receiving, at the computing system, a first message directed toward the first mobile computing device;
receiving, at the computing system, a second status update indicating the activity state of the first mobile computing device, the second status update based on the modified configuration values of the first mobile computing device; and
responsive to receiving the second status update, transmitting, over the network, by the computing system, the first message to the first mobile computing device.

2. The method of claim 1, wherein the activity state of the first mobile computing device indicates whether the first mobile computing device is one or more of idle, awake, or unavailable.

3. The method of claim 1, wherein the second status update indicating that activity state of the first mobile computing device indicates a current location of the first mobile computing device.

4. The method of claim 3 further comprising:
receiving status updates from one or more additional computing devices, each status update indicating a location of an additional computing device; and
determining a quantity of computing devices within a predetermined range of the first mobile computing device based on the locations of the one or more additional computing devices;
the initiating the modification of the one or more configuration values of the first mobile computing device responsive to determining the quantity of computing devices within the predetermined range.

5. The method of claim 1 further comprising:
determining a usage pattern associated with the first mobile computing device responsive to receiving, at the computing system, a plurality of additional status updates from the first mobile computing device, each additional status update indicating the activity state of the first mobile computing device.

6. The method of claim 5, wherein the initiating the modification of the one or more configuration values is further based on the determined usage pattern associated with the first mobile computing device.

7. The method of claim 1 further comprising transmitting a request to the first mobile computing device to send a status update,
wherein the receiving the first status update is responsive to transmitting the request to the first mobile computing device.

8. A system comprising:
a computing system in communication, over a network, with a plurality of computing devices remote from the computing system, including a first mobile computing device;
at least one processor operatively coupled to the computing system; and
at least one memory operatively coupled to the at least one processor and configured for storing data and instructions that, when executed by the at least one processor, cause the system to:
receive, at the computing system, a first status update from the first mobile computing device, the first status update indicative of an activity state of the first mobile computing device, wherein the activity state indicates at least a current location of the first mobile computing device;
transmit, automatically over the network, instructions to the first mobile computing device to adjust one or more configuration values at the first mobile computing device based at least on the current location of the first mobile computing device;
receive, at the computing system, a first message directed toward the first mobile computing device;
receive, at the computing system, a second status update from the first mobile computing device;
determine a time for delivery of the first message to the first mobile computing device based on the second status update; and
transmit the first message to the first mobile computing device responsive to the determined time occurring.

9. The method of claim 8, wherein the status update from the first mobile computing device includes an indication of battery power, and the transmitted instructions to the first mobile computing device are based on the battery power indication.

10. The method of claim 8, wherein the status update from the first mobile computing device includes an indication of a type of network in use by the first mobile computing device, and the transmitted instructions to the first mobile computing device are based on the network type.

11. The method of claim 8, wherein the instructions transmitted to the first mobile computing device are based on a current time and date.

12. The method of claim 8, wherein the transmitted instructions to the first mobile computing device are based on a usage history associated with the device.

13. A computer program product comprising a non-transitory computer-readable medium that stores instructions executable by one or more processors to perform a method, the method comprising:
receiving, over a network, at a computing system, a plurality of messages directed to plurality of computing devices remote from the computing system, including a first mobile computing device;
identifying a first message as being directed to the first mobile computing device;
receiving, at the computing system, a first status update indicating an activity state of the first mobile computing device, wherein the activity state indicates at least a current location of the first mobile computing device;
prompting, automatically over the network, based on at least the current location of the first mobile computing device received as part of the first status update, the first mobile computing device to set one or more configuration values at the first mobile computing device, the configuration values determining when the first mobile computing device sends status updates;
receiving, at the computing system, a second status update indicating the activity state of the first mobile computing device, the second status update sent based on the set configuration values; and
responsive to receiving the second status update, transmitting, over the network, by the computing system, the first message to the first mobile computing device.

14. The non-transitory computer-readable medium of claim 13, wherein the activity state of the first mobile computing device indicates whether the first mobile computing device is able to receive messages from the computing system.

15. The non-transitory computer-readable medium of claim 13, wherein the method further comprises:
receiving status updates from one or more additional computing devices, and determining a location of each of the additional computing devices based on the status updates; and
determining a quantity of computing devices within a predetermined range of the first mobile computing device based on the locations of the one or more additional computing devices, and
the prompting the first mobile computing device to set one or more configuration values of the first mobile computing device is responsive to determining the quantity of computing devices within the predetermined range.

16. The non-transitory computer-readable medium of claim 13, wherein the prompting the first mobile computing device to set the one or more configuration values is further based on a user behavior associated with the device.

17. The non-transitory computer-readable medium of claim 13, wherein the method further comprises transmitting a request to the first mobile computing device to send a status update, the receiving the first status update being responsive to transmitting the request to the first mobile computing device.

* * * * *